United States Patent [19]

Murata et al.

[11] Patent Number: 4,759,010
[45] Date of Patent: Jul. 19, 1988

[54] TIME SWITCH WITH A DUAL MEMORY STRUCTURE-TYPE CONTROL MEMORY

[75] Inventors: Hatsuho Murata; Hideyuki Hirata, both of Tokyo, Japan

[73] Assignee: NEC Corporation, Tokyo, Japan

[21] Appl. No.: 7,037

[22] Filed: Jan. 27, 1987

[30] Foreign Application Priority Data

Jan. 24, 1986 [JP] Japan .................................. 61-11852
Feb. 20, 1986 [JP] Japan .................................. 61-37007
Feb. 20, 1986 [JP] Japan .................................. 61-37008

[51] Int. Cl.[4] .............................................. H04J 3/24
[52] U.S. Cl. .......................................... 370/58; 370/66
[58] Field of Search .............................. 370/66, 68, 58

[56] References Cited

U.S. PATENT DOCUMENTS

| | | | |
|---|---|---|---|
| 3,761,894 | 9/1973 | Pilc et al. ............................. | 370/68 |
| 3,967,070 | 6/1976 | Srivastava et al. .................... | 370/66 |
| 4,402,078 | 8/1983 | Athenes et al. ....................... | 370/66 |
| 4,510,597 | 4/1985 | Lewis ................................... | 370/66 |

Primary Examiner—Douglas W. Olms
Assistant Examiner—Min Jung
Attorney, Agent, or Firm—Helfgott & Karas

[57] ABSTRACT

A time switch with a dual structure-type control memory utilizing a time division time switch. The switch is equipped with a speech memory unit into which digital signals to be interchanged are temporarily written, and a control memory unit into which addresses to be accessed by the speech memory unit are written. The control memory unit has first and second memories. Each memory has an input/output section connected to a memory controller. The memories are set during hard and soft cycles so that when either one of the memories is set in a hard cycle the other memory is set in a soft cycle. The hard cycle is a speech-control data read-only mode. The soft cycle is a speech-control data read-write mode under control from the memory controller.

5 Claims, 9 Drawing Sheets

TIME SWITCH WITH A DUAL MEMORY STRUCTURE-TYPE CONTROL MEMORY

BACKGROUND OF THE INVENTION

The present invention relates to a time switch with dual memory structure-type control memory for use in a time division multiplex communication switching system.

A time division switching system switches connections between two channels of two different time division multiplex communication paths.

Known time division time switches utilize a speech memory and a control memory. Input signals on the channels on a number of input lines, for instance N lines, are sampled at a constant interval and written into the speech memory. The signals are then read out in a prescribed sequence (which is different from that of the writing of the input signals into this speech memory) and output into the channels on the N different output lines. This enables connection of the N communication lines connected to the output side with the N communication lines connected on the input side in any desired combination on a channel basis.

The control memory is used to supply read addresses for the speech memory. Read addresses for the N lines, i.e. N such addresses are written into the control memory and read out in a prescribed sequence and supplied to the speech memory.

To change the connection between channels, the corresponding read address written into the control memory is altered.

Sequential reading of control data written into the control memory is called a hard cycle (HW), and writing or reading of control data to rewrite them is called a soft cycle (SW).

In a first conventional method, for instance, the hard and soft cycles are alternately repeated in an HW, SW, HW, SW . . . sequence, as shown in FIG. 1, and a selected number of such repetitions constitutes one frame. This frame length can be designated for instance, as 125 microseconds (usec), which corresponds to the above-mentioned sampling interval of input signals.

When this method is used, when processing such as rewriting of control data is unnecessary, neither reading out of nor writing into the control memory is executed even if there is an SW. These operations are executed only when necessary, and then, only during the SW when operations are required as illustrated by hatching.

In a second conventional method illustrated in FIG. 2, one frame is composed of HW's alone as a rule, and only when an instruction of rewriting or the like is received from outside through an interface, an HW is replaced with a SW. This method has two versions: in one version, control data is written unconditionally into a prescribed address at any desired timing, regardless of the read address of the control memory in the HW, while in the other version, the read address of the control memory and write control data are monitored during coincidence with the write address.

Now, according to the first method, equal numbers of HW's and SW's are present in each frame, so that its multiplicity can be represented as follows, where THW and TSW are the lengths of time the HW and SW respectively take and TF is the length of a frame, as shown in FIG. 1:

$$TF/(THW+TSW) \tag{1}$$

On the other hand, the multiplicity of the second system can be represented in the following way, as shown in FIG. 2:

$$TF/THW \tag{2}$$

Comparison of the two formulas (1) and (2), reveals a disadvantage of the first method in that its multiplicity is much less than that of the second method.

On the other hand, the second method, though permitting a higher degree of multiplicity, is subject to the possibility that, where a SW is replaced in a disregard of the read address of the control memory in a HW, an error may occur in the control data read out of the control memory and supplied to the speech memory.

Furthermore, the arrangement to replace a HW with a SW only when the read address of the control memory is found identical with the write address involves another disadvantage that the control data can be rewritten only once in a frame.

When a conventional time switch using either of the above-mentioned methods is employed, new control data written in from outside through an interface is read out by a HW when the turn comes for its address to be read out, and the speech path is reconfigured on the basis of this control data. However, since the writing of this control data takes place asynchronously with the position in the frame composition of the speech data on the speech path, no control is possible over the timing at which the speech path is reconfigured as a result of the rewriting of the control data.

It is therefore impossible to reconfigure the speech path in an active state with connection by two or more time switches without affecting adversely (contracting or cutting off) the contents of speech memory.

An object of the present invention is, therefore, to provide a time switch with a dual memory structure-type control memory wherein control data can be read out of or written into a control memory as desired without reduction of multiplicity.

Another object of the invention is to provide a time switch with a dual memory structure-type control memory having dual memories wherein either memory can be used as a read operation-only mode with no SW inserted, so that the multiplicity can be increased over that achievable in the prior art.

Still another object of the invention is to provide a time switch with a dual memory structure-type control memory wherein control data or the like can be written into a control memory as many times as desired and at any desired timing within a single frame.

SUMMARY OF THE INVENTION

According to one aspect of the invention, there is provided a time switch system with a dual memory structure-type control memory which has a time division time switch. This switch is equipped with a speech memory unit into which digital signals to be exchanged are temporarily written and a control memory unit into which addresses to be accessed by the speech memory unit are written. The time division time switch employs a control memory unit having first and second memories, and a memory controller. The memory controller is connected to each input/output section of the first and second memories. The memories are set during hard and soft cycles so that when either one of the memories is set in a hard cycle, which is the speech path control data read only mode, the other is set in a soft cycle, which is the speech path control data read-write mode under control from the memory controller. The soft cycle and hard cycle modes of the two memories are switched between each other in response to a mode switching signal.

BRIEF DESCRIPTION OF THE DRAWINGS

The present invention will be described in conjunction with the accompanying drawings in which.

In the drawings, the same reference numerals denote respectively the same structural elements.

DESCRIPTION OF THE PREFERRED EMBODIMENTS

Figure 1:
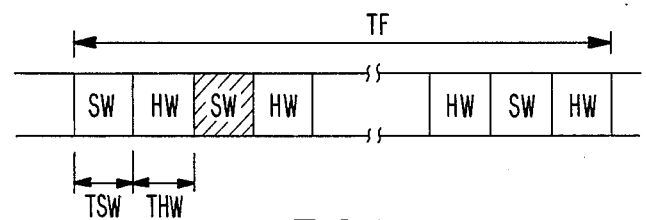
FIGS. 1 and 2 are time charts for different prior art methods.
Figure 2:
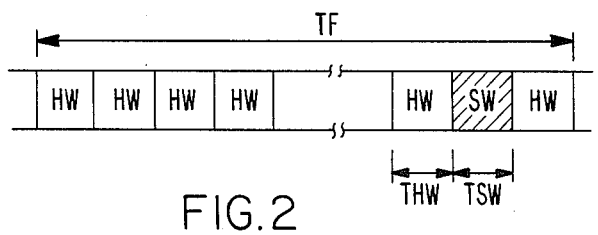

FIGS. 1 and 2 illustrate prior art techniques and have already been described.

Figure 3:
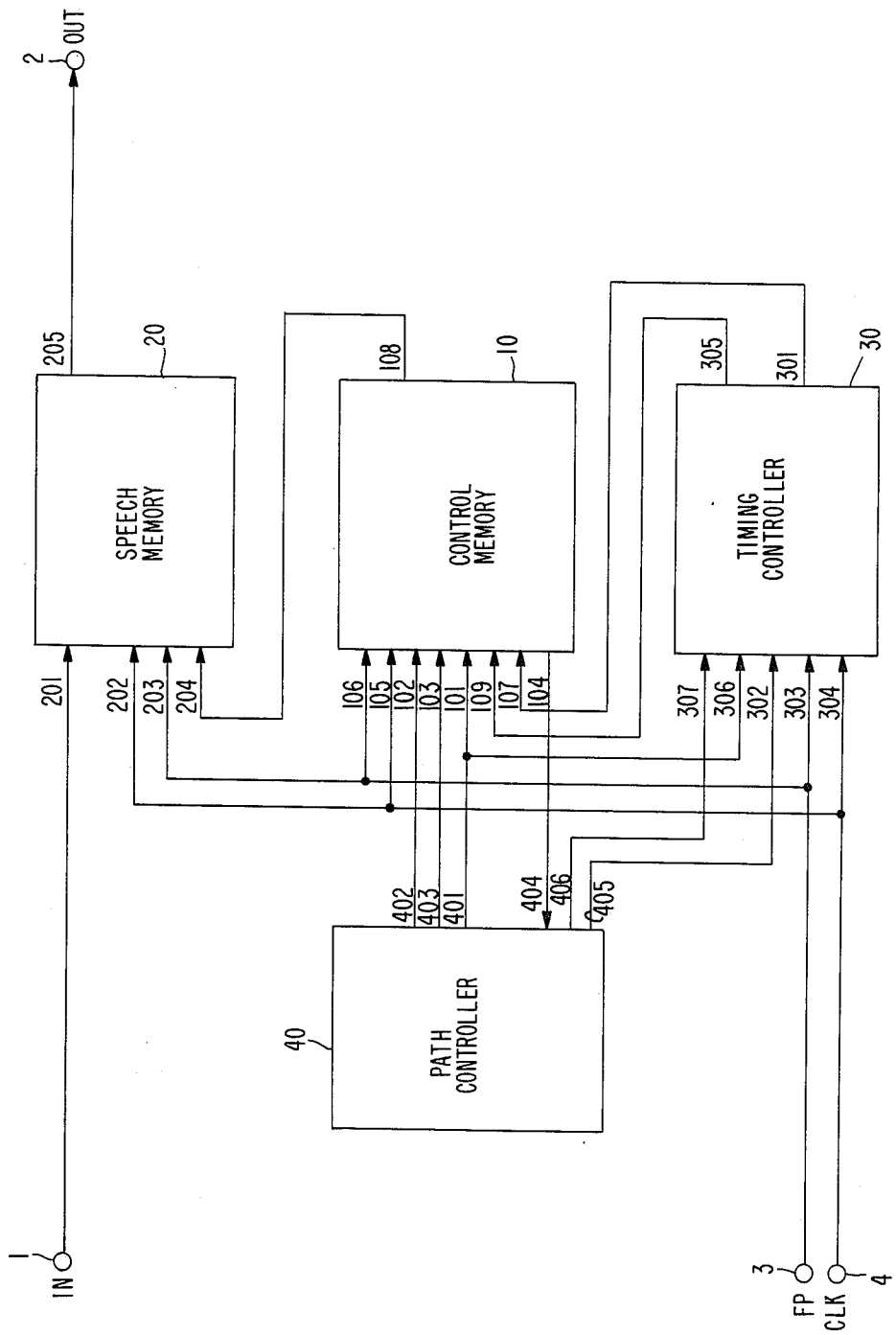
FIG. 3 is a block diagram of one embodiment of the present invention.

Referring to FIG. 3, one embodiment of the present invention includes a speech memory 20 disposed in a speech path between a speech data input terminal 1 and a speech data output terminal 2; a control memory 10 for controlling the speech memory 20; a timing controller 30 for supplying as a mode switching signal a control-memory-write-completion signal from a path controller 40 to the control memory 10; and the path controller 40 comprising a microprocessor and other constituent elements. A frame pulse FP and a clock pulse CLK are supplied to the control memory 10, the speech memory 20 and the timing controller 30 via terminals 3 and 4, respectively.

Figure 4:
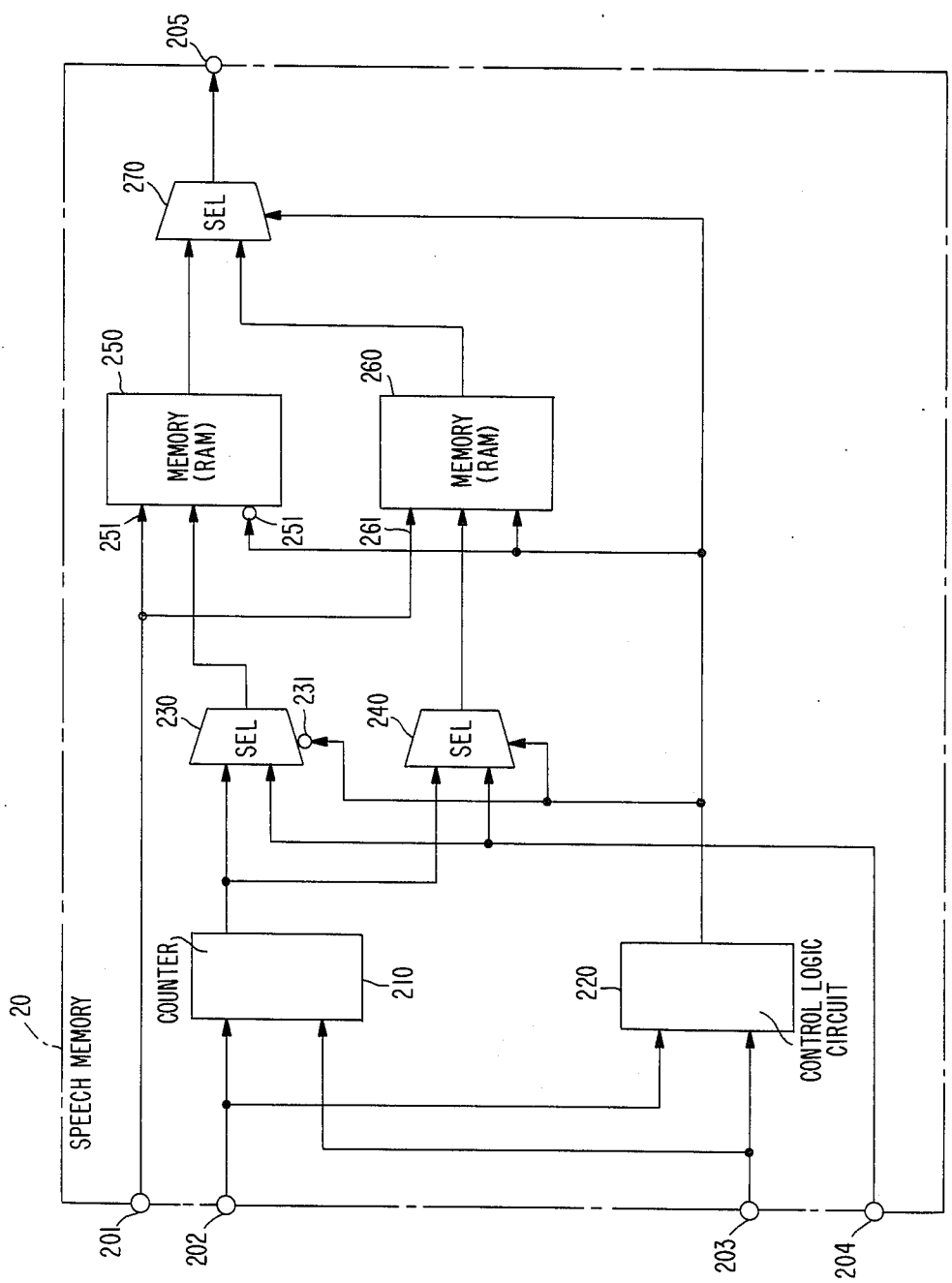
FIG. 4 is a detailed drawing of the speech memory in FIG. 3.

Referring to FIG. 4, the speech memory 20 comprises a counter 210, a control logic circuit 220, selectors 230, 240 and 270, a first memory 250 and a second memory 260. The first memory 250 and the second memory 260 consist of random accessor memory (RAM) elements of the same structure.

Speech data inputted from the input terminal 1 to a speech data input terminal 201 is fed to terminals 251 and 261 of the first memory 250 and the second memory 260, respectively. The counter 210 counts up the clock pulses CLK supplied from terminal 4 to a clock terminal 202, and supplies its output to the selectors 230 and 240. The counter 210 is reset by the frame pulse FP supplied from terminal 3 to a frame pulse terminal 203, and again counts the clock pulses CLK. The control logic circuit 220 receives the clock pulses CLK from the terminal 202 and the frame pulse FP from the terminal 203, and supplies selection signals to the selectors 230, 240 and 270, the first 250 and the second memory 260.

The selectors 230 and 240 receive read address data for the first memory 250 or the second memory 260, supplied from the control memory 10 via terminal 108 to a terminal 204. The selector 230 and the first memory 250 are provided with inverter circuits 231 and 251, respectively, and receive selection signals whose contents are inverse to those entered into the selector 240 and the second memory 260, respectively. If, for instance, a selection signal is supplied from the control logic circuit 220 in a certain frame, the selector 230 feeds the count of the counter 210 to the first memory 250, and the selector 240 feeds the second memory 260 with the read address supplied from the terminal 204. The first memory 250 successively writes the data inputted from the terminal 201 according to the sequential addresses outputted via said selection 230 (speech data write mode). In the meantime, the second memory 260 reads out data written in the previous one frame according to the address from the selector 240 (speech data read mode), and it is supplied to the selector 270, which outputs this read data to an output terminal 205. In the next frame, the frame pulse FP is supplied to the control logic circuit 220 to invert the selection signal, and an operation inverse to the foregoing is done: i.e., the first memory 250 is set in the speech data read mode, the second memory 260, in the speech data write mode, and from the output terminal 205 is supplied via the selector 270 the read data from the first memory 250.

Figure 5:
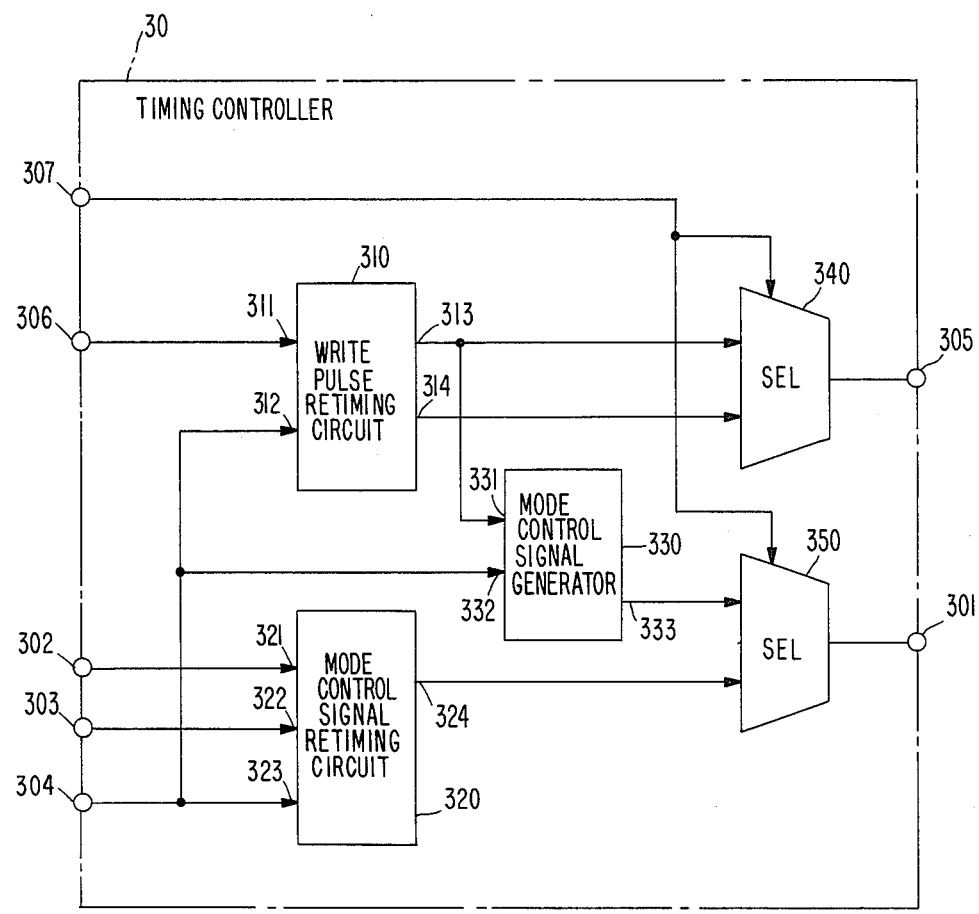
FIG. 5 is a detailed drawing of the timing controller in FIG. 3.

Now referring to FIG. 5, the timing controller 30 is composed of a write-pulse-retiming circuit 310, a mode-control-signal-retiming circuit 320, a mode-control-signal generator 330, and selectors 340 and 350.

Figure 6:
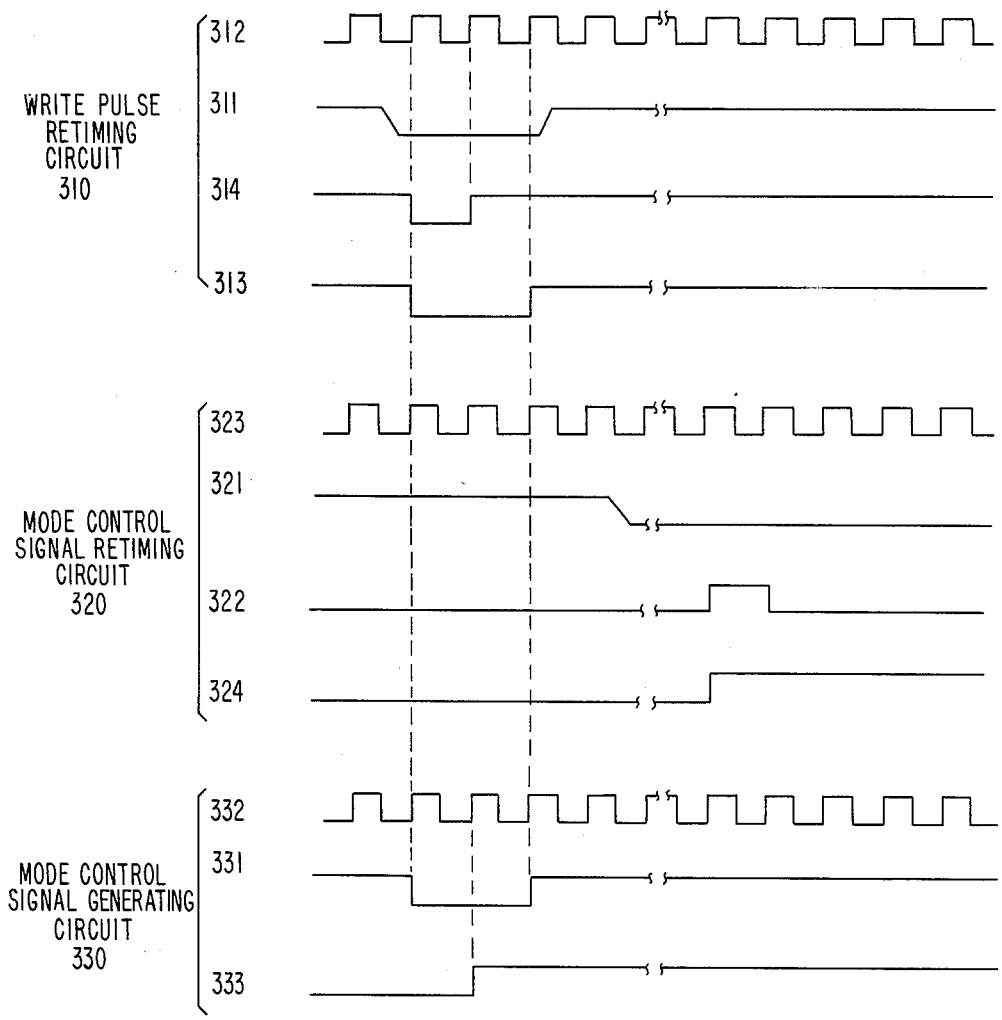
FIG. 6 is a timing chart for the timing controller in FIG. 5.

The following description will also refer to the timing chart of FIG. 6.

A terminal 311 of the write pulse retiming circuit 310 receives a write control signal from a terminal 306. A terminal 312 of the circuit 310 receives the clock pulses CLK from a terminal 304. The circuit 310 synchronizes the write control signal with the clock pulses CLK, and supplies a one clock portion of a write synchronization signal to one of the input terminals of the selector 340 by way of a terminal 314 and a two clock portion of a write synchronization signal to the other input terminal of the selector 340 by way of a terminal 313.

Said generator 330 receives the input of the two-clock portion of the write synchronization signal and of the clock pulses CLK to a terminal 331 and a terminal 332, respectively, and supplies, immediately after the first one-clock, portion of the write synchronization signal, a mode switching signal to the selector 350 from terminal 333.

Said retiming circuit 320 has three input terminals 321, 322 and 323. A write completion signal is fed to terminal 321 from terminal 302. The terminal 322 receives the frame pulse FP from a terminal 303. The terminal 323 receives the clock pulses CLK from the terminal 304. In response to the write completion signal, the frame pulse FP and the clock pulses CLK, the circuit 320 produces a write completion signal synchronized with the frame pulse FP which is supplied from a terminal 324 to the selector 350.

A write-mode-selection signal is supplied to the selectors 340 and 350 by way of an input terminal 307.

When in the frame-asychronized write mode, the selector 340 supplies an output terminal 305 with the output from the terminal 313 as a write synchronization signal, while the selector 350 supplies an output terminal 301 with the output from the terminal 333.

When in the frame-synchronized write mode, the selector 340 supplies an output from the terminal 314 to the output terminal 305, while the selector 350 supplies the output terminal 301 with a write completion signal, synchronized with the frame pulse FP, from the terminal 324 as a mode switching control signal.

Detailed description is dispensed with herein of the path controller 40 composed of a microprocessor.

Figure 7:
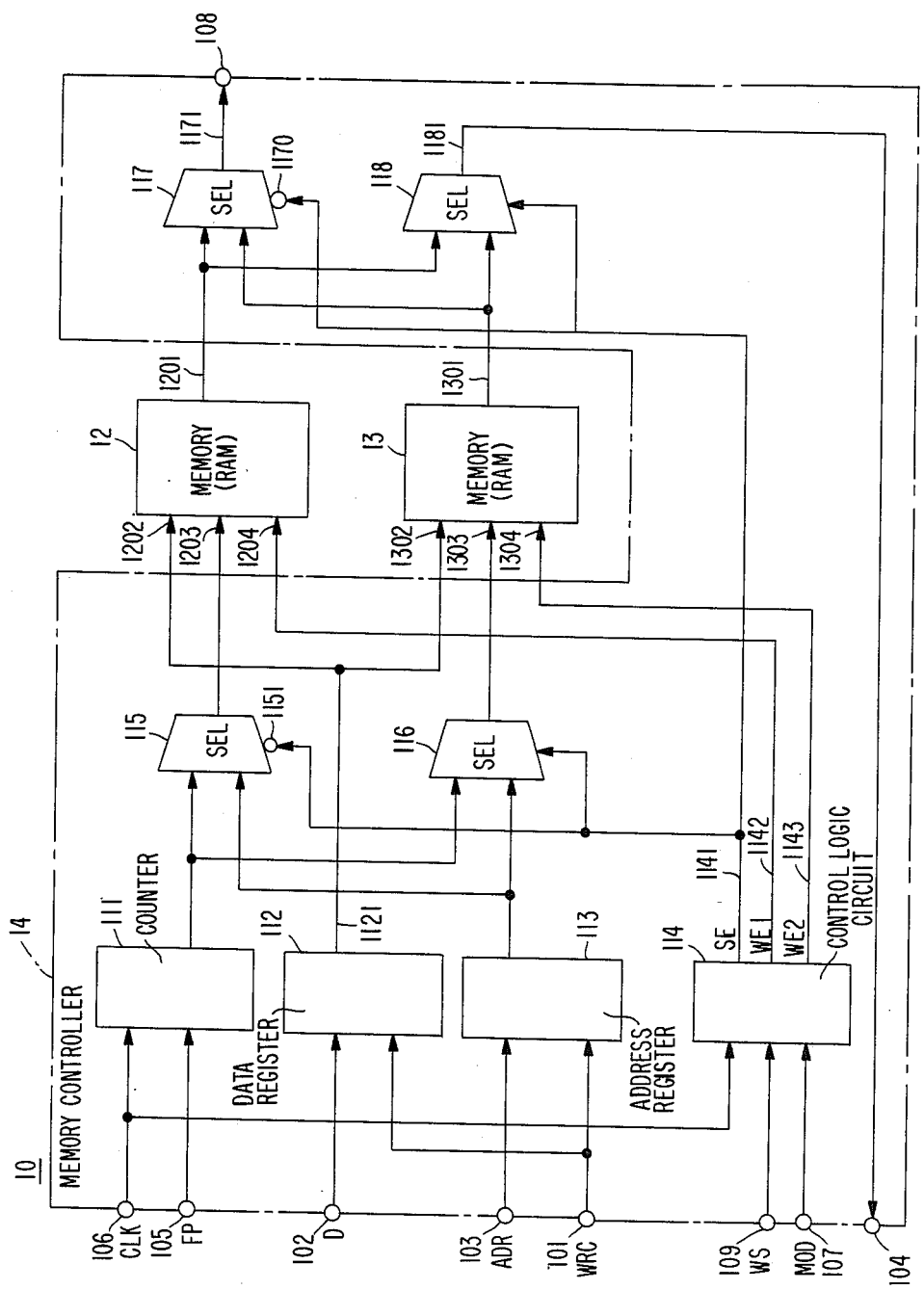
FIG. 7 is a detailed drawing of the control memory in FIG. 3.

Referring to FIG. 7, the control memory 10 having a first memory 12, a second memory 13 and a memory controller 14. The memories 12 and 13 consist of RAM elements of the same structure, capable of reading and writing control data of exactly the same contents.

Reading and writing of control data by these memories 12 and 13 is controlled by a memory controller 14 provided in their input/output section.

The controller 14 comprises a counter 111, a data register 112, an address register 113, a control logic circuit 114 and four selectors 115 to 118.

The counter 111 is a so-called address counter for counting the clock pulses CLK given from an input terminal 106 and supplies its count to the selector 115. Its count is reset by the frame pulse FP given from a frame pulse input terminal 105 in each frame.

The data register 112 receives control data D, to be written into the memories 12 and 13, from a terminal 402 of the path controller 40 through an input terminal 102 and, when a write-indicating control signal WRC is entered into a terminal 101, supplies the control data D to a data bus 1121.

For writing the control data D into the memory 12 or 13, the address register 113 receives an address signal ADR from a terminal 403 of the path controller 40 through an input terminal 103. When the WRC is inputted to the terminal 101, the address register 113 supplies the address signal ADR to the selectors 115 and 116.

The control logic circuit 114 receives the clock signals CLK supplied from the terminal 106, a mode switching signal MOD entered from a terminal 107 and a memory write signal WS entered through a terminal 109, and supplies a selection signal SE for selection by the four selectors 115 to 118 to a bus 1141, and write enable signals WE1 and WE2 for the first memory 12 and the second memory 13 to buses 1142 and 1143, respectively. The MOD, supplied from the timing controller 30, is a signal for switching between a memory in the speech control data read operation only mode (for instance the first memory 12) and a memory in the speech-control data read-write mode (for instance the second memory 13).

The selectors 115 and 116 select the count data from the counter 111 and the address signal from the address register 113 according to the selection signal SE, and supplied either of them to the memories 12 and 13. The output signal of the selector 115 is sent to the first memory 12, and that of the selector 116, to the second memory 13. The selector 115 is provided with an inverter 1151 in its input section for the SE. Therefore, selection signals SE whose contents are inverse to each other are supplied to the selectors 115 and 116. Accordingly, if the selector 115 supplies the first memory 12 with the count output by the counter 111, the other selector 116 will supply the second memory 13 with the address signal output from the address register 113.

The output signals 1201 and 1301 of the first memory 12 and the second memory 13, respectively, are given to both selectors 117 and 118. Each of the two selectors 117 and 118, receiving the outputs 1201 and 1301 of the memories 12 and 13, selects and outputs one or the other of them according to the SE. This SE has the same contents as those entered into the selectors 115 and 116.

The selector 117 is also provided with an inverter 1170 in its selection signal input section. Therefore between these selectors 117 and 118, exactly like between said selectors 115 and 116, there is the relationship that when one supplies the output signal 1201 of the first memory 12 the other supplies the output signal 1301 of the second memory 13.

Here the output 1171 of the selector 117 is connection to an output terminal 108, which is a terminal for supplying control data to the speech memory 20. The output of the selector 118 is connected to an output terminal 104, which is a terminal for supplying control data to the path controller 40 for controlling reading out of and writing into the control memory.

The control memory 10, composed as hitherto described, operates in the following manner.

First will be described a condition in which the first memory 12 of this unit operates as a read operation-only mode.

The counter 111, after being reset by the frame pulse FP given to the terminal 105, counts the clock pulses CLK supplies from the terminal 106, and then counts up successively.

The control logic circuit 114 supplies the selection signal SE to the bus 1141 to cause the selector 115 to supply this count to the address terminal 1203 of the first memory 12. At the same time, the selector 117 so selects as to supply the output 1201 of the first memory 12 to the output terminal 108 connection to the speech memory 20.

As a result, control data written into an address corresponding to the count of the counter 111 are successively read out of the first memory 12 to the speech memory 20. In this manner, a hard cycle is executed for the first memory 12.

At this time, on the other hand, the second memory 13 is used as a read-write memory. The following description refers to a condition of rewriting in the frame-asynchronized write mode. To the terminal 307 of the timing controller 30 is fed from the terminal 406 of the path controller 40 a signal to select the frame-asynchronized write mode. The address signal ADR is supplied from the path controller 40 into the address register 113 via the terminal 103, and as the control data D to be written into that address is at the same time fed to the data register 112 via the terminal 102, the memory write signal WS is sent to the control logic circuit 114 via the terminal 109.

The logic circuit 114 has already supplied the selection signal SE to the bus 1141. Therefore, selection is so made that the selector 116 supplies the output of the address register 116 to the terminal 1303 of the second memory 13. Here, the circuit 114 supplies the write enable signal WE2 to the terminal 1304 of the second memory 13 via the bus 1143. In this way, the control data of the data register 112 is supplied to the second memory 13 via the data bus 1121, and is written into an address corresponding to the address signal ADR.

The path controller 40 demands, as required, reading of the control data written into the read-write memory. When it does, the ADR for reading is given to the address register 113, and the read-demanding control signal WS, into the control logic circuit 114.

The circuit 114 inverts the write enable signal WE2, which has been supplied to the second memory 13, to give a read enable signal. The output signal 1301 of the second memory 13 is supplied to the terminal 104 connection to the path controller 40 by the selector 118 to effect control data reading.

In this manner a soft cycle is executed for the second memory.

After that, the control data read operation-only mode (hard cycle HW) is achieved by inverting the selection signal SE, and the control memory 12 side is turned into the control data read-write mode (soft cycle SW).

Immediately after outputting of this signal, the mode switching signal MOD is supplied to the input terminal 107 of the control memory 10 via the terminal 301 of the timing controller 30, which further supplies a one-clock portion of the memory write signal WS to the input terminal 109 of the control memory 10 via the terminal 304.

Figure 8:
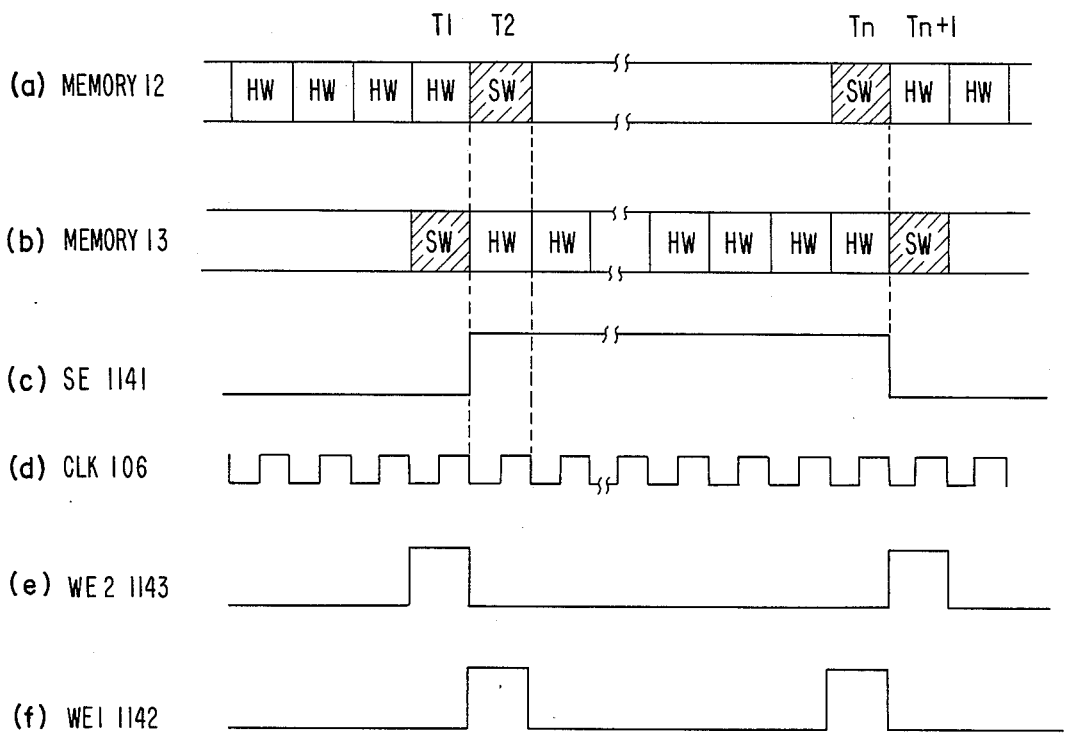
FIGS. 8 and 9 are time charts illustrating the operating of the embodiment illustrated in FIG. 3.

Based on the basic procedure described above, interchanging of the control memory elements is accomplished in the memory 10 at a timing shown in FIG. 8. The HW and SW are executed in the same cycle as that of the clock pulses 106 (FIG. 8(d)). The first control memory 12, used as a read operation-only mode at first executes the HW alone.

First, as the control data is written into the second control memory 13 at a time T1 (FIG. 8(b)), there arises a difference in control data contents as to address between the first control memory 12 and second control memory 13. And to the speech memory should be supplied the rewritten control data.

Accordingly the control logic circuit 114, after executing the write procedure, achieves interchanging by inverting the selection signal SE (FIG. 8(c)), to place the first memory 12 in a read-write mode and the memory 13 in a read operation-only mode.

Then during the next clock pulse, the address signal stored in the address register 113 is supplied to the first control memory 12 via the selector 115 to execute writing of the control data stored in the data register 112. At this time, the write enable signals WE1 and WE2 are output from the control logic circuit 114 each for a one-word duration (FIG. 8(e) and (f)).

Thus, after interchanging the read operation-only mode and the read-write mode, an external circuit can be used to write the control data into the memory 12.

A hard cycle is then executed for the second control memory 13 (FIG. 8(b)). Further, as the control data is written into the memory 12 at a time Tn (FIG. 8(a)), the read operation-only mode and control circuit are again interchanged and, in the same manner as described above, the same control data is written into the memory 13 at the same address at a time Tn+1. The relationship between the write enable signals WE1 and WE2 at this time is inverse to that at the time T1 and T2 (FIG. 8(e) and (f).

Whereas the control data D and the address signal ADR are supplied from external circuits into this memory control circuit only once, they are retained in the data register 112 and the address register 113, respectively and used twice each.

In this way, external circuits can be handled in a known manner. Except when the control data is written into the memory in the read-write mode, the contents of the memory in the read operation-only mode and of the memory in the read-write mode can be kept identical.

The case in which the contents of the control memories 12 and 13 are rewritten from outside in the frame-synchronized write mode will now be described. It is assumed that, now, the selectors 115 and 116 are to select the outputs of the counter 111 and of the address register 113, respectively, and the selectors 117 and 118, to select the outputs of the first memory 12 and of the second memory 13, respectively.

Described below is a condition in which the contents of the memories 12 and 13 are to be rewritten from outside in the frame-synchronized write mode. At this time, to the write-mode-selection input terminal 307 is supplied a signal from the path controller 40 to select the frame-synchronized write mode. The control data D and control address ADR from the path controller 40 are once stored in the data register 112 and the address register 113, respectively, in response to the write signal WRC fed to the write-read control terminal 101. In this state, the memory 13 is assumed to be in the control data write-read mode. At this time, the control logic circuit 114 supplies the write signal WE2, synchronized with the clock CLK, as write signal for the memory 13 to an output terminal 1146 connected to the write-synchronization-signal input terminal 109 of the memory 13. As a result, new speech-memory control data is written into the memory 13. This procedure is repeated a number of times as required. After that, when the path controller 40 completes the required rewriting, a control-memory-rewrite-completion (CMRC) signal is outputed by way of the output terminal 405. This CMRC signal is supplied to the input terminal 302 of the timing controller 30, which supplies the mode switching signal, synchronized with the frame pulse FP and supplied via the input terminal 303, to the output terminal 301.

Next will be described the operation in the frame synchronized write mode with reference to the time chart of FIG. 9. Speech data supplied from the speech data input terminal 1 to the terminal 201 of the speech memory 20 has the frame composition shown in FIG. 9. Now, a time slot 11 inputted to the terminal 201 is once written into the speech memory 20, and read out into a time slot 23 of the output terminal 205 in accordance with control data C1 supplied from the output terminal 108 of the control memory 10 and given the control data input terminal 204. Similarly, a time slot 14 present in the same frame is read into a time slot 24 of the output terminal 205 in accodance with the control data C1.

The simultaneous alternation of the output time slots from 23 to 25 and from 24 to 20 takes place as follows. Having written new control data C2 into that memory element of the control memory 10 which is in the control data read-write mode by way of interfaces 101, 102 and 103, the path controller 40 supplies the CMRC signal to the output terminal 405 at a timing t121. The control memory rewrite completion signal is entered into the input terminal 302 of the timing controller 30, and the output as mode switching signal (the output of the output terminal 301 of the timing controller 30) is synchronized with the frame pulse sent to the other input terminal 303 of the timing controller 30.

In performing the writing procedure, the timing controller 30 turns the signal supplied from the terminal 401 via the input terminal 306 into a one-clock portion of the write synchronization signal, synchronized with the clock CLK, and supplies the signal to the input terminal 109 of the memory 10 via the output terminal 305.

Figure 9:
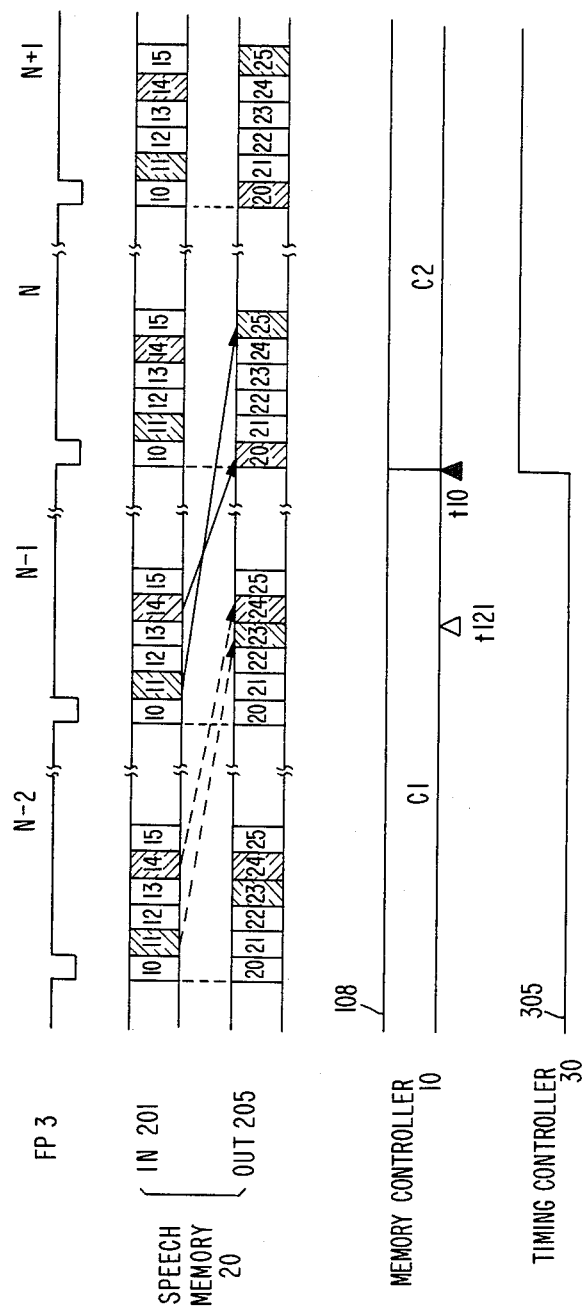

The mode switching signal 305 is a level signal like the one shown in FIG. 9, and switches the modes of the two memory elements of the control memory 10 at a timing 510. As a result, the control data supplied to the speech memory 20 from the timing t10 on is switched to the new control data C2, and the recomposition of the speech path is thereby completed for the subsequent frames (i.e., the frame N and thereafter).

Next will be described another embodiment of the invention with reference to FIGS. 10 and 11.

This embodiment comprises control memories 2010 and 2110, speech memories 2020 and 2120, timing controllers 2030 and 2130, and path controllers 2040 and 2140, and since they are the same as the corresponding ones illustrated in FIGS. 4, 5 and 7, their details are dispensed with here. This alternative embodiment is further provided with a timing synchronizing logic circuit 2050. FIG. 10 illustrates only the main wiring necessary for describing the operation of this embodiment.

Figure 10:
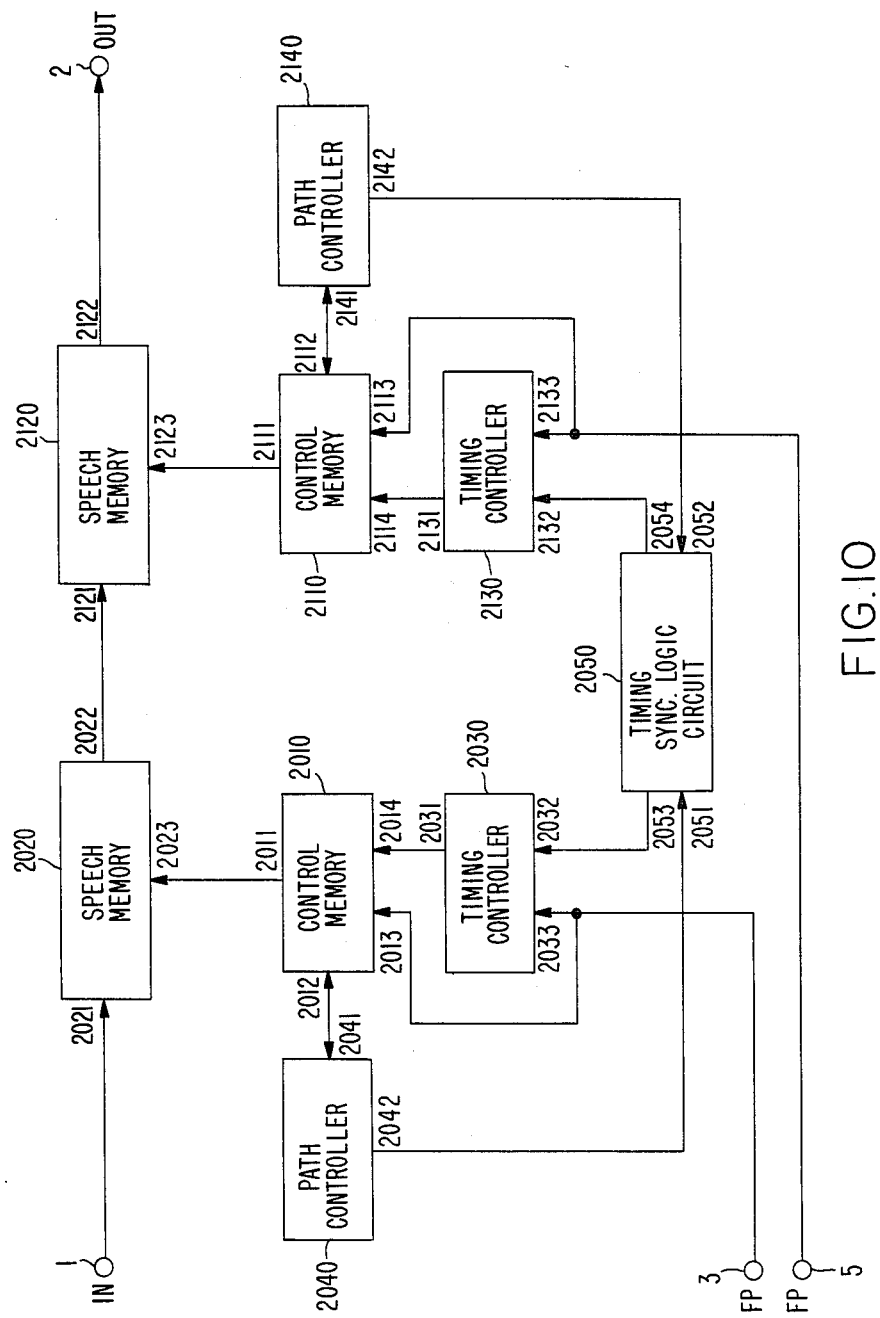
FIG. 10 is a block diagram illustrating another embodiment of the invention.

Now referring to FIG. 10, in this embodiment, a speech path from the speech-data input terminal 1 to the speech-data output terminal 2 includes the speech memories 2020 and 2120 connected in series, and the composition of this speech path is controlled by the control memories 2010 and 2110. In the embodiment of FIG. 10, both those memories 2020 and 2120 consist of two pairs of speech memory elements each. While one pair of speech memory elements A and B (not shown) are in the speech data write mode to sequentially write frame-forming speech data, given from input terminals 2021 and 2121, at a rate of one frame for a one time slot of data, the other pair of speech memory elements A' and B' (not shown) sequentially read out to output terminals 2022 and 2122 prewritten speech data in response to control data given from control input terminals 2023 and 2123.

The speech data fed to the terminal 1 is once written into the speech memory 2020 via the input terminal 2021. When a one frame of data has been fully written, the speech memory 2020 sequentially reads out the speech data to the output terminal 2022 depending on the control data supplied from an output terminal 2011 of the control memory 2010 and entered from the input terminal 2023. The speech data read out to the output terminal 2022 is again written into the speech memory 2120 via the input terminal 2121, and the memory 2120 supplies it to the output terminal 2122 in accordance with the control data supplied from the control input terminal 2123, resulting in the formation of a speech path leading to the speech data output terminal 2.

Now, since both control memories 2010 and 2110 have two pairs of control memory elements each, one pair are in the control data read-only mode to sequentially supply the contents to the output terminals 2011 and 2111, and in the meantime the other pair are in the control data read-write mode, so that they are connected, by way of interfaces 2012 and 2112 to outside, to interfaces 2041 and 2141 of the path controllers 2040 and 2140. Further the frame pulse determining the timing of control data reading is supplied to frame pulse inputs 3 and 5, supplied to the control memories 2010 and 2110 via input terminals 2013 and 2113, respectively, and at the same time supplied to input terminals 2033 and 2133 of the timing controllers 2030 and 2130 to make possible synchronization of timing control signals for control memory mode switching supplies to input terminals 2032 and 2132 and supply of mode switching signals to output terminals 2031 and 2131.

The path controllers 2040 and 2140 for rewriting the control memories, having completed the required rewriting, output a CMRC signal by way of output terminals 2042 and 2142. This CMRC signal is fed to input terminals 2051 and 2152 of the timing synchronizing logic circuit 2050, which, after detecting the outputting of the control memory rewrite completion signal by both the controllers 2040 and 2140, supplies at a proper timing, output terminals 2053 and 2054 with a timing control signal for mode switching.

Next the operation of this alternative embodiment will be described with references to FIGS. 10 and 11. Out of the speech data supplied to the input terminal 1, the kth time slot Tk is connected via the speech memories 2020 and 2120 to the xth output of the speech data supplied to the output terminal 2. It is supposed that frame pulse suitable for the input and output phases of the speech data are given to the frame pulse input 3 determining the frame position of the input speech data and to the frame pulse input 5 determining that of the output speech data.

The time slot Tk fed to the input terminal 1 is once written into the speech memory 2020, and read out to a time slot T of the output terminal 2022 in accordance with control data C11 fed to the input terminal 2023 from the output terminal 2011 of the control memory 2010. The speech data read out to a time slot T is written into the speech memory 2120, and read out to a time slot Tx of the output terminal 2122 in accordance with control data C21 output from the output terminal 2111 of the memory 2010 and entered into the input terminal 2123.

Now it is considered how the speech path Tk-Tl-Tx formed in this way is reorganized into Tk-Tm-Tx without affecting the input/output relationships existing between the input terminal 1 and the output terminal 2. The path controller 2040, as it writes new control data C12 into that memory element of the control memory 2010 which is in the control data read-write mode via the interfaces 2041 and 2012, supplies the CMRC signal to the output terminal 2042. Similarly, the path controller 2140 write new control data C22 into the control memory 2110, and supplies the CMRC signal to the output terminal 2142. In the meantime, the control memories 2010 and 2110 output the control data C11 and C21 from those of their memory elements which are in the control data read-only mode, and thereby control the speech memories 2020 and 2120.

Figure 11:
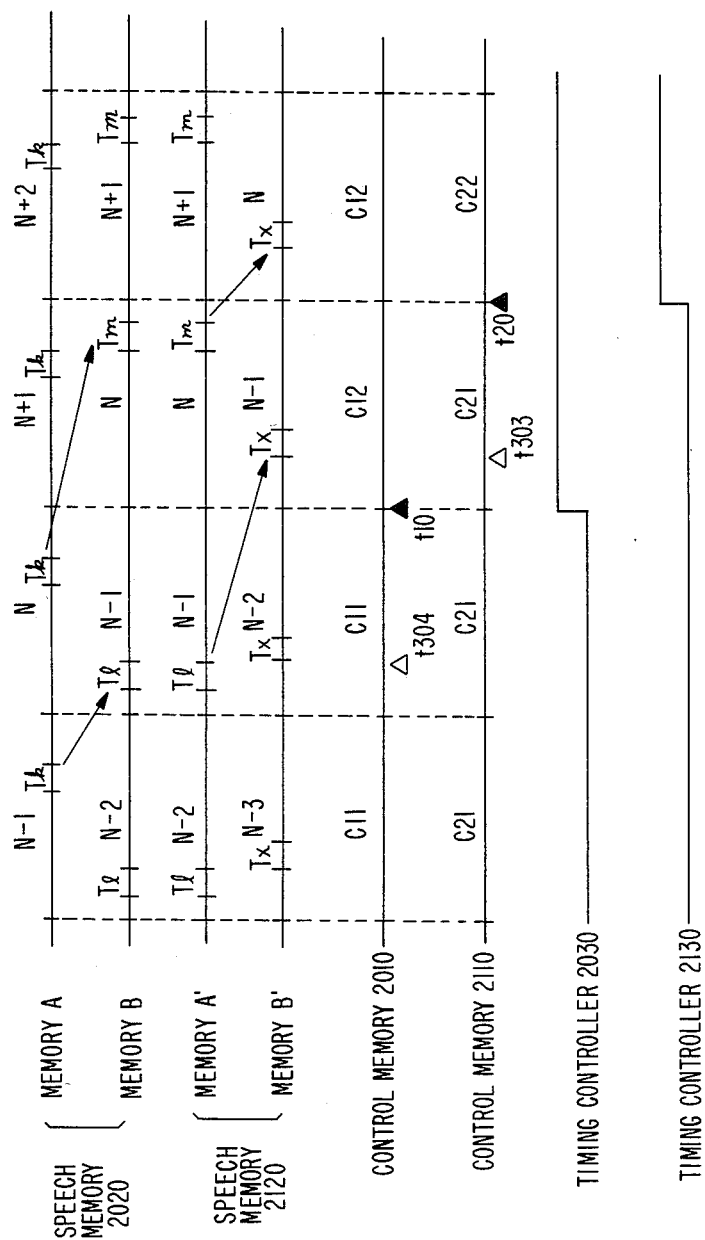
FIG. 11 is a time chart for describing the operation of the embodiment illustrated in FIG. 10.

The timing synchronizing logic circuit 2050, having received the CMRC signal, supplies a timing control signal for mode switching to the output terminal 2053 at a timing t304 shown in FIG. 11 and to the output terminal 2054 at a timing t303. This timing control signal for mode switching is synchronized by the timing controllers 2030 and 2130 respectively with the frame pulses supplied to the control memories 2010 and 2110 (given to the input terminals 2033 and 2133, respectively), and causes mode switching signals varying at timings t10 and t20 to be supplied to the output terminals 2031 and 2131. As a result, the memory 2010, having undergone mode switching of its two pairs of memory elements, is in the control data read-write mode until the timing t10, controls the speech memory 2020 with the memory elements, into which the new control data C12 has been written, in the control data read-only mode, and alters in the frame N, the time slot of the output from $T_l$ to Tm. The control memory 2110 switches the mode at the timing t20, one frame later than t10, and as a result of the time slot m of the frame N is output to Tx of the speech data supplied to the output terminal. There can also be readily inferred an application wherein a speech path gate of a space switch is provided between the two speech memories in the preferred embodiment illustrated in FIG. 1.

What is claimed is:

1. A time switch with a dual memory structure-type control memory utilizing a time division time switch equipped with a speech memory unit into which digital signals to be interchanged are temporarily written and a control memory unit into which addresses to be accessed by said speech memory unit are written, wherein the time division switch comprises:

a control memory unit having first and second memories and a memory controller, each memory having an address input, data input, data output and write enable signal input, the controller having an address output connected to the address inputs of both memories, a data output connected to the data inputs of both memories and a write enable signal output connected to the write enable signal inputs of both memories;

said memories being set during hard and soft cycles so that when either one of the memories is set in a hard cycle which is a speech-control read-only mode, the other memory is set in a soft cycle, which is a speech-control data read-write mode under control from the memory controller;

the soft cycle and hard cycle modes of said two memories being switched between each other in response to a mode switching signal.

2. A time switch with a dual memory structure-type control memory as claimed in claim 1, wherein the modes of said first and second memories are switched between each other immediately after the execution of control data writing into the first memory in the soft cycle, and the same control data is written into the second memory at the same memory address as that of the execution into said first memory.

3. A time switch with a dual memory structure-type control memory as claimed in claim 1, further comprising a path controller for synchronizing a speech control memory rewrite completion signal, supplied from a timing controller, with a frame pulse determining the timing of control data reading from said control memory, and using the output of said path controller as said mode switching signal.

4. A time switch with a dual memory structure-type control memory comprising;

a control memory unit having a first memory in a hard cycle, which is a speech-control data read-only mode, and a second memory in a soft cycle, which is a mode for reading speech-control data out of, or writing them into, a path controller, and means for switching the modes of said first and second memories in response to a mode switching signal;

a speech memory unit having first and second memory elements controlled by said control memory unit one memory element being set in the speech data write mode for writing frame-forming speech data for each time slot, the other memory element being set in the speech data read mode for reading out one frame of speech data for each time slot, and means for switching the modes of said speech memory elements in synchronization with the frame fromed speech data; and a timing controller for supplying as mode switching signal a control memory write completion signal supplied from a path controller, to said control memory unit in synchronization with the frame pulse.

5. A time switch with a dual memory structure-type control memory which utilizes at least two speech path switches, said switches having in common a timing synchronizing logic circuit, each switch comprising:

a path controller for generating all control-memory-write completion output signals, said logic circuit detecting said output signals and producing mode-switching timing control signals;

a control memory unit having a first memory in a hard cycle, which is a speech-control data read-only mode, and a second memory in a soft cycle, which is the mode for reading speech control data out of, or writing them into, a path controller, and means for switching the modes of said first and second memories in response to a mode switching signal;

a speech memory unit having first and second memory elements controlled by said control memory unit, of which one memory element is set in the speech data write mode for writing frame-forming speech data in time slot units, and the other memory element is set in the speech data read mode for reading out one frame of speech data for each time slot, and means for switching the modes of said speech memory elements in synchronization with the frame formed speech data; and a mode-switching timing controller for synchronizing the mode-switching timing control signals supplied from said timing synchronizing logic circuit with the frame pulse determining the control data read timing of said control memory unit, and supplying said control signal to said control memory unit.

* * * * *